W. W. & G. H. SAUNDERS.
CEREAL PROCESS AND PRODUCT.
APPLICATION FILED APR. 21, 1913.
1,097,882.
Patented May 26, 1914.
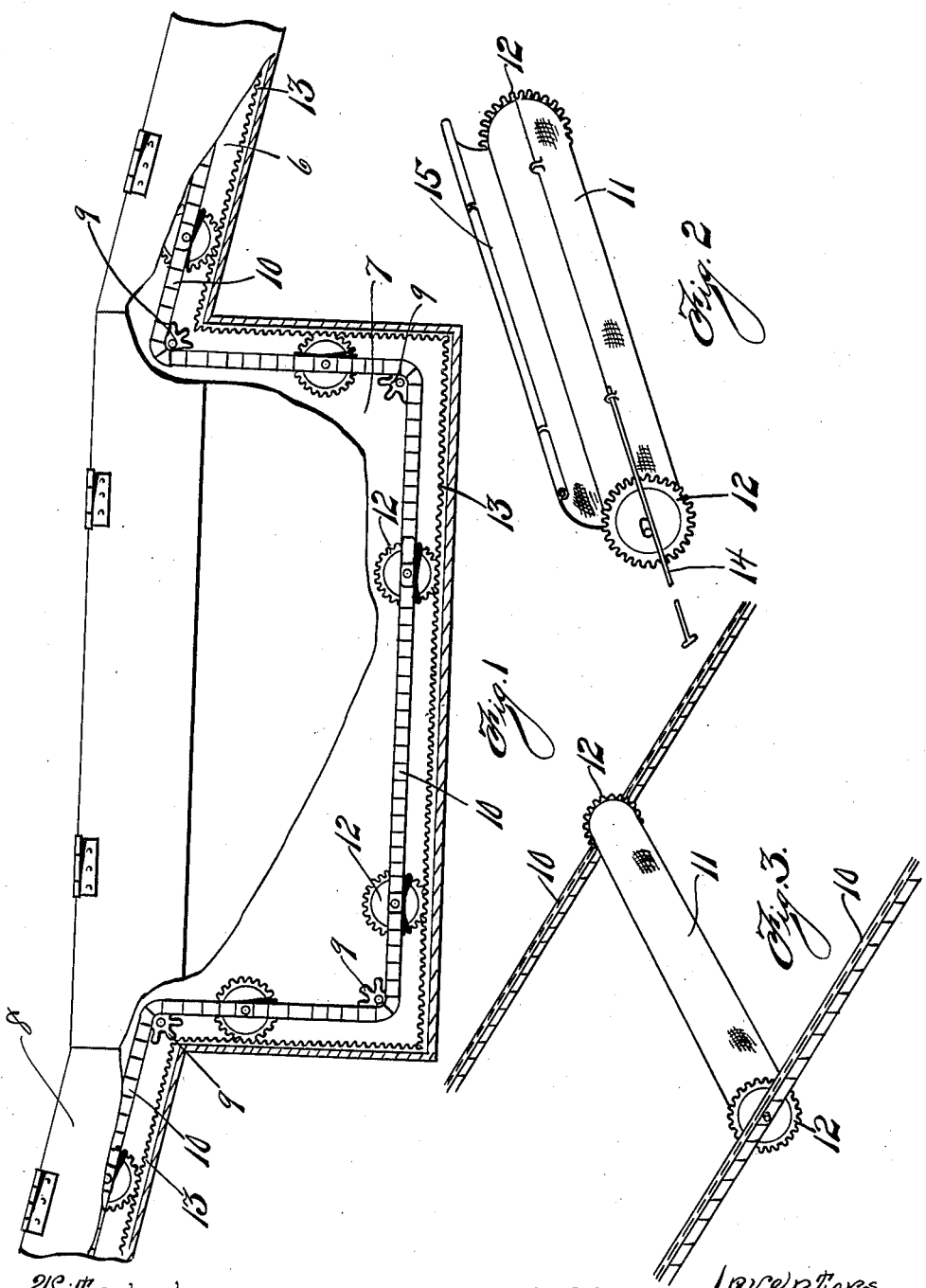

UNITED STATES PATENT OFFICE.

WILLIAM W. SAUNDERS, OF CLEVELAND, AND GEORGE H. SAUNDERS, OF AKRON, OHIO.

CEREAL PROCESS AND PRODUCT.

1,097,882. Specification of Letters Patent. Patented May 26, 1914.

Application filed April 21, 1913. Serial No. 762,556.

*To all whom it may concern:*

Be it known that we, WILLIAM W. SAUNDERS and GEORGE H. SAUNDERS, citizens of the United States, residing at Cleveland, Cuyahoga county, Ohio, and Akron, in the county of Summit and State of Ohio, respectively, have invented certain new and useful Improvements in Cereal Processes and Products, of which the following is a specification.

Our invention relates to cereal products or products prepared from wheat, oats, maize, rice, barley and in general all grains and amylaceous seeds or kernels. And its object is to provide products of this character which shall be ready for consumption as a palatable, readily-digestible and highly nutritious article of food either alone or when mixed with milk or cream, sweetened or non-sweetened, or in soups, and, on account of its rich, nutty flavor, of great value for confectioners' use as a substitute for nuts.

With these objects in view our invention consists in a cereal in the form of grains the starch granules of which have been converted into a thoroughly-cooked, palatable, easily-digestible, crisp or frangible condition, and in the method of producing the same.

Our invention, moreover, consists in such further features as will be hereinafter set forth and pointed out in the claims.

The accompanying drawings show part of apparatus for performing the method, and Figure 1 is a longitudinal sectional view thereof; Figs. 2 and 3 are details in perspective of one of the cages and conveyer.

In preparing our new cereal product we prefer placing the grain in suitable vats and thoroughly covering with pure water which is maintained at a temperature of, approximately 90 to 130 degrees Fahrenheit for a period of twenty-four to forty-eight hours, or at a lower temperature for greater length of time, during which period the grain is frequently turned or stirred to insure uniform absorption of water to the point of saturation. When this condition has been attained the grain is made surface-dry by any suitable method, preferably as described herein. The next stage of the process is the cooking or frying of the grain. This may be accomplished by any means that will bring about the sudden submersion of the water-filled grain, in either vegetable or animal oil at a sufficient-high temperature—say from 400 to 500 degrees Fahrenheit—for a period of 30 to 90 seconds. In practice we prefer the use of a vegetable oil—olive or cotton-seed. The result of submerging the water-filled grain in the oil at high temperature is the transformation of the water, within the grain, into steam, which serves to thoroughly cook the interior of the grain. While this transformation is going on within the grain the exterior is being fried by contact with the intensely hot oil, which, however, is prevented from penetrating the grain because of the water and steam within. The grain is withdrawn from the oil vat while yet filled with steam, say in from 30 to 90 seconds after immersion, the free oil is removed from the surface, and the grain is passed through a heated tunnel to thoroughly eliminate aqueous moisture.

It should be understood that our purpose in saturating the grain with water previous to treatment with the heated oil is, first, to insure thorough steam cooking, second to produce a condition of crispness and fragility, entirely overcoming all tendency to toughness or sponginess under any conditions and converting the starch granules into a slightly enlarged and easily crushable condition, and third to prevent the absorption by the grain of excess oil, permitting only a surface coating which, by excluding atmospheric moisture, renders the grain permanently crisp. It should also be understood that our reasons for employing the hot oil in our process are manifold, viz: first, to accomplish the rapid cooking of the previously saturated grain; second, to impart a rich, nutty, parched or grilled flavor; third, to add to the natural nutritive qualities of the grain; fourth, to insure exclusion of atmospheric moisture and render the product permanently crisp. This treatment in the hot oil and the subsequent passage of the grain through a tunnel maintained at a temperature above the boiling-point of water thoroughly cooks and sterilizes the grain. It should be further understood that the grain may be cooked either by steam or in boiling water—but in no case by dry heat—previous to treatment in the hot oil. When the proper condition for this method has been reached the grain takes on a semitransparent appearance. When this method of cooking is employed the drying tunnel following the oil treatment may be held at a temperature below the boiling-point of water.

For the practice of our invention we prefer to proceed as follows: The grain is entirely submerged in pure water, contained in vats so arranged as to maintain the desired temperature, and is frequently turned or stirred to insure uniform absorption of water, during a period ranging from twelve to forty-eight hours at a temperature of from 90 to 130 degrees Fahrenheit, or at lower temperature for a longer period until complete saturation is reached. The water is now drawn from the vat, the grain is flooded with fresh, pure water, the grain being constantly agitated to remove any impurities that may have adhered to the surface of the grain. This water is now drawn off and the grain allowed to thoroughly drain when it is removed from the vat and placed in cages 11, shown in the drawings. These cages are then placed in a carrier or conveyer consisting of two parallel endless sprocket chains 10. The grain is carried by this conveyer, in the cages, revolving through a tunnel 6 and heated to approximately 200 degrees Fahrenheit and of sufficient length to drive off surface moisture and raise the temperature of the grain to prevent excessive chilling of oil.

It is necessary to regulate the speed of the conveyer to the time required for properly frying the grain and the tunnel must be of sufficient length, to, at that speed, give ample time for the surface-drying and warming of the grain.

After passing through the warming-tunnel the grain filled cages are carried, by the conveyer, through the tank 7 containing hot oil, and thence into the final drying tunnel 8 for the removal of surplus oil and any remaining aqueous moisture. This tunnel must be of sufficient length to (at the speed required for the proper frying of the grain) thoroughly eliminate aqueous moisture and insure complete cooking and sterilization of the grain. Passing from this tunnel the cages are removed and emptied.

The chains travel over sprocket wheels 9 to guide the same through the tunnels and the oil tank, and the cylindrical cages (which may be made of wire fabric) are rotated as they travel by means of sprocket wheels 12 on the ends of the cages engaging racks 13 in the tunnels and tank. The cages have hinged lids 15 held closed by a lock bar 14. It will be understood, however, that the process may be performed by any other suitable apparatus or means.

What we claim as new is:

1. As a new article of manufacture, a cereal product consisting of whole grain steam-cooked within and fried without.

2. As a new article of manufacture, a hulled, thoroughly cooked, slightly enlarged grain having its starch granules fried to a frangible, porous and crisp condition.

3. As a new article of manufacture, whole grain, thoroughly steam-cooked within and fried without, and having its starch granules converted into a frangible, porous and crisp condition and ready for immediate consumption.

4. As an article of manufacture, grain, thoroughly steam-cooked and fried in hot oil, and having its starch granules converted into a frangible, porous and crisp condition.

5. The process of treating cereal grain, comprising soaking the grain, and then submerging the same in hot oily liquid.

6. The process of treating cereal grain, comprising soaking the grain, drying the surface thereof, submerging the grain in a hot oily liquid, and finally drying the same.

7. The process of treating cereal grain, comprising soaking the grain, surface-drying the same, submerging the grain in a hot oily liquid for a period of time sufficient to cook the grain and fry the surface thereof, and finally drying the same.

In testimony whereof, we do affix our signatures in presence of two witnesses.

WILLIAM W. SAUNDERS.
GEORGE H. SAUNDERS.

Witnesses:
JOHN A. BOMMHARDT,
J. B. DAVIS.